United States Patent
Host et al.

(10) Patent No.: US 11,703,152 B2
(45) Date of Patent: Jul. 18, 2023

(54) WRAP BRACKET WITH STRAP MOUNT

(71) Applicant: Panduit Corp., Tinley Park, IL (US)

(72) Inventors: Daniel E. Host, Orland Park, IL (US); Surendra Chitti Babu, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/485,855

(22) Filed: Sep. 27, 2021

(65) Prior Publication Data

US 2022/0128176 A1 Apr. 28, 2022

Related U.S. Application Data

(60) Provisional application No. 63/094,994, filed on Oct. 22, 2020.

(51) Int. Cl.
| | |
|---|---|
| *F16L 3/233* | (2006.01) |
| *F16B 2/08* | (2006.01) |
| *F16L 3/06* | (2006.01) |
| *F16L 3/22* | (2006.01) |
| *F16B 7/04* | (2006.01) |
| *F16L 3/223* | (2006.01) |

(52) U.S. Cl.
CPC .............. *F16L 3/233* (2013.01); *F16B 2/08* (2013.01); *F16L 3/06* (2013.01); *F16L 3/22* (2013.01); *F16L 3/221* (2013.01); *F16L 3/222* (2013.01); *F16L 3/2338* (2013.01); *F16B 7/0433* (2013.01); *F16L 3/223* (2013.01)

(58) Field of Classification Search
CPC combination set(s) only.
See application file for complete search history.

(56) References Cited

U.S. PATENT DOCUMENTS

| | | | |
|---|---|---|---|
| 580,199 | A | 4/1897 | Sommerfeld |
| 622,687 | A | 4/1899 | Holyland et al. |
| | | (Continued) | |

FOREIGN PATENT DOCUMENTS

| | | | |
|---|---|---|---|
| DE | 1944216 B2 | * 10/1970 | ............... F16B 2/14 |
| EP | 2251553 A1 | 11/2010 | |
| | (Continued) | | |

OTHER PUBLICATIONS

Ladder Cable Ties, Difvin, https://www.difvan.com/ladder-cable-ties/ and catalog p. 31 located at https://www.difvan.com/wp-content/uploads/2019/05/DIFVAN-Catalog.pdf; 3 pages; 2021.

*Primary Examiner* — Eret C McNichols
(74) *Attorney, Agent, or Firm* — Christopher S. Clancy; James H. Williams; Aimee E. McVady

(57) ABSTRACT

A wrap bracket formed from a strap and a clamp to secure a cable bundle to a support. The strap includes an intermediate portion, a first portion extending from the intermediate portion in a first direction and a second portion extending away from the intermediate portion in a second direction opposite the first direction. The second portion engages the first portion to mount the strap to the support. The clamp includes a base that is secured to the intermediate portion of the strap. A first tab and a second tab extend in opposite directions away from the base. The first and second tabs wrap around the cable bundle to secure the cable bundle to the base.

11 Claims, 11 Drawing Sheets

(56) References Cited

U.S. PATENT DOCUMENTS

| | | | | |
|---|---|---|---|---|
| 656,274 | A | 8/1900 | Streeter | |
| 1,084,407 | A | 1/1914 | Deist | |
| 2,895,193 | A | 7/1959 | Ridgers | |
| 3,078,532 | A | 2/1963 | Bywater | |
| 3,273,213 | A * | 9/1966 | Zurkowski | F16L 3/06 24/298 |
| 3,668,744 | A * | 6/1972 | Moody | F16B 2/08 248/68.1 |
| 3,964,133 | A * | 6/1976 | Wasserlein, Jr. | F16L 3/233 24/23 R |
| 4,340,996 | A * | 7/1982 | Starace | B65D 63/02 24/23 EE |
| 4,750,241 | A | 6/1988 | Powell | |
| 4,754,529 | A * | 7/1988 | Paradis | B65D 63/1072 24/30.5 P |
| 5,332,179 | A * | 7/1994 | Kuffel | F16L 3/233 248/68.1 |
| 5,395,018 | A * | 3/1995 | Studdiford | B62J 11/00 224/463 |
| 5,472,159 | A * | 12/1995 | Kuffel | F16L 3/00 248/68.1 |
| 7,171,729 | B2 * | 2/2007 | Bulanda | F16L 3/233 24/23 R |
| 7,178,203 | B2 * | 2/2007 | Pearson | F16L 3/137 248/74.3 |
| 7,241,071 | B2 * | 7/2007 | Carraher | E04C 5/163 52/719 |
| 8,559,782 | B2 * | 10/2013 | Cleofe | H02G 3/30 24/339 |
| 8,635,745 | B2 * | 1/2014 | DeBerry | F16L 3/233 24/25 |
| 8,783,630 | B2 * | 7/2014 | Gronlund | E21B 17/1035 248/74.1 |
| 8,793,841 | B2 * | 8/2014 | DeBerry | A44B 11/12 24/23 R |
| 8,955,198 | B2 | 2/2015 | Carnevali | |
| 8,991,774 | B2 * | 3/2015 | Hajduch | H02G 3/32 248/220.22 |
| 9,009,923 | B2 * | 4/2015 | Rouleau | H02G 3/30 24/16 PB |
| 9,067,717 | B2 * | 6/2015 | DeMik | F16B 7/0433 |
| 9,309,719 | B2 * | 4/2016 | Sylvester | H02G 3/30 |
| 9,742,347 | B2 | 8/2017 | Port | |
| 10,008,841 | B2 * | 6/2018 | Rouleau | F16L 3/137 |
| 10,065,776 | B2 * | 9/2018 | Prevot | B65B 13/305 |
| 10,206,334 | B2 * | 2/2019 | Hendricks | A01G 5/04 |
| 10,243,505 | B1 | 3/2019 | Kurtz | |
| 10,315,817 | B2 | 6/2019 | Martin | |
| 10,519,660 | B2 * | 12/2019 | Evans | F16B 7/0493 |
| 10,926,927 | B2 * | 2/2021 | Hong | B65D 63/1018 |
| 10,938,192 | B2 * | 3/2021 | Christensen | F16B 2/10 |
| 11,020,264 | B2 * | 6/2021 | McNeill | F16B 2/08 |
| 11,067,201 | B2 * | 7/2021 | Varale | F16L 3/221 |
| 11,174,970 | B1 * | 11/2021 | McCadie | F16L 21/065 |
| 2009/0265896 | A1 * | 10/2009 | Beak | F16B 2/08 24/270 |
| 2014/0259620 | A1 * | 9/2014 | Hicks | F16L 3/233 29/525.01 |
| 2019/0149087 | A1 | 5/2019 | Affentranger et al. | |

FOREIGN PATENT DOCUMENTS

| | | | | |
|---|---|---|---|---|
| FR | | 2293650 A1 * | 7/1976 | ............ A01G 9/128 |
| FR | | 2933459 A1 * | 1/2010 | ............ A01G 9/128 |
| GB | | 313867 A | 10/1929 | |
| WO | | 2015100474 A1 | 7/2015 | |
| WO | WO-2019032276 A1 * | | 2/2019 | ................ F16B 2/14 |

* cited by examiner

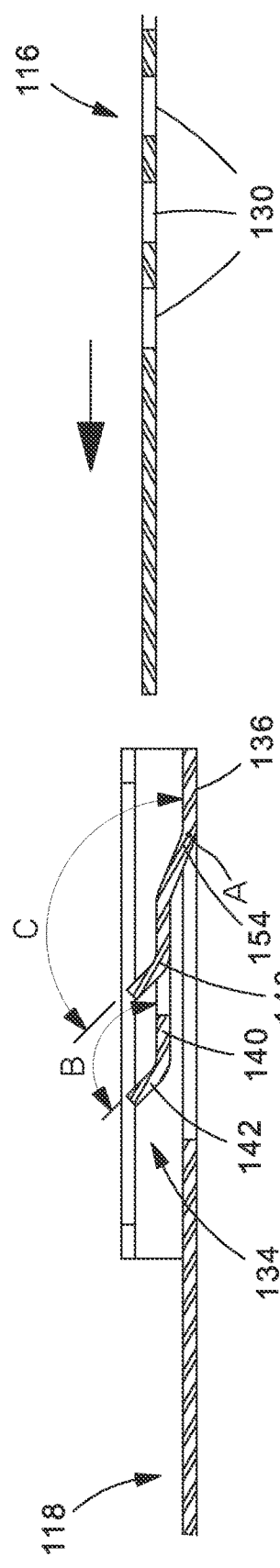
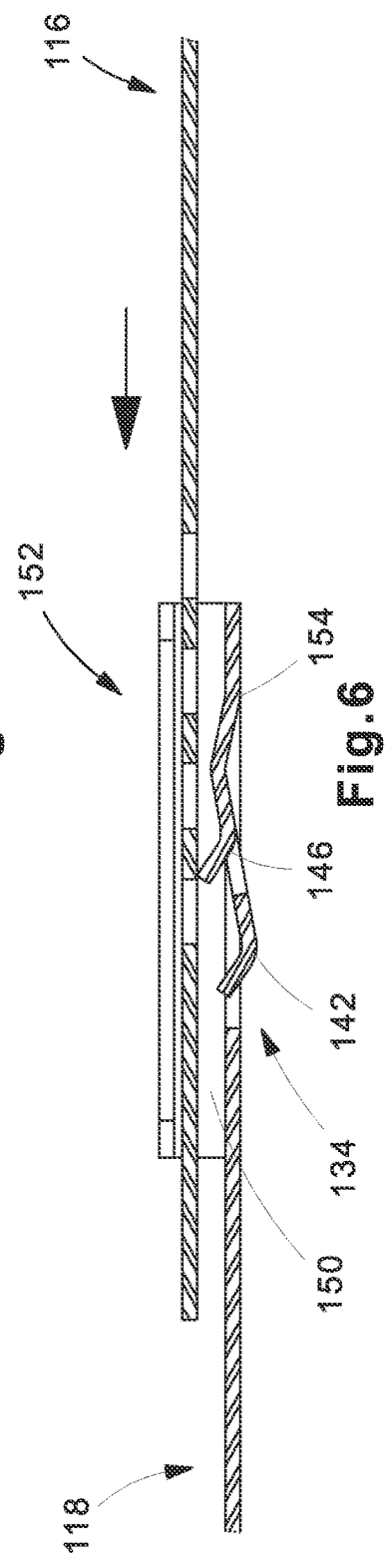
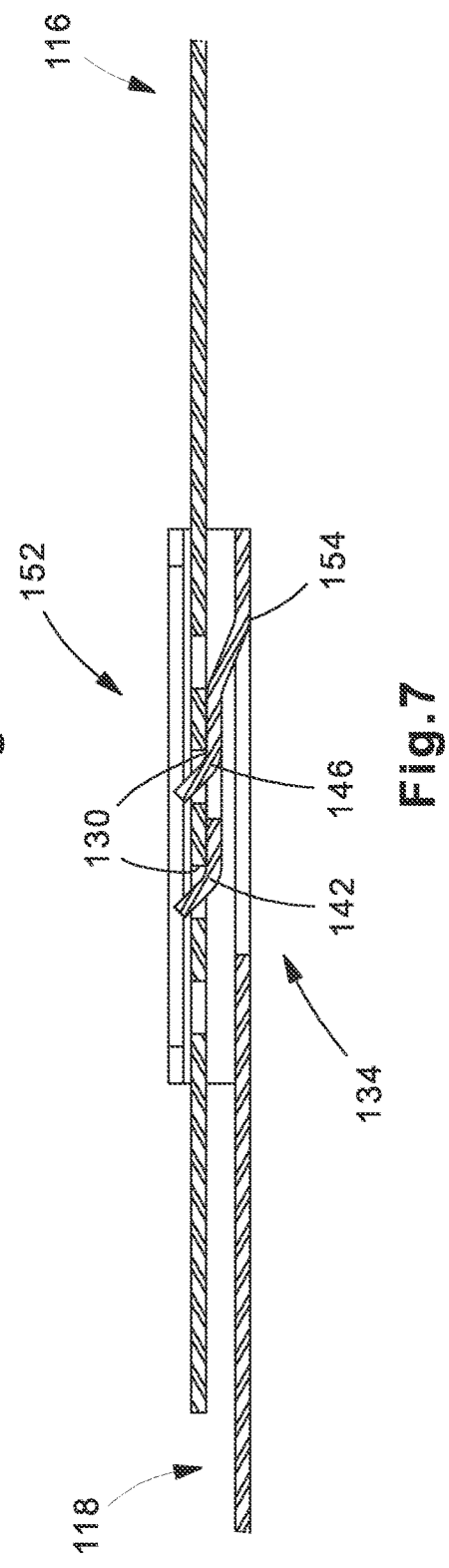

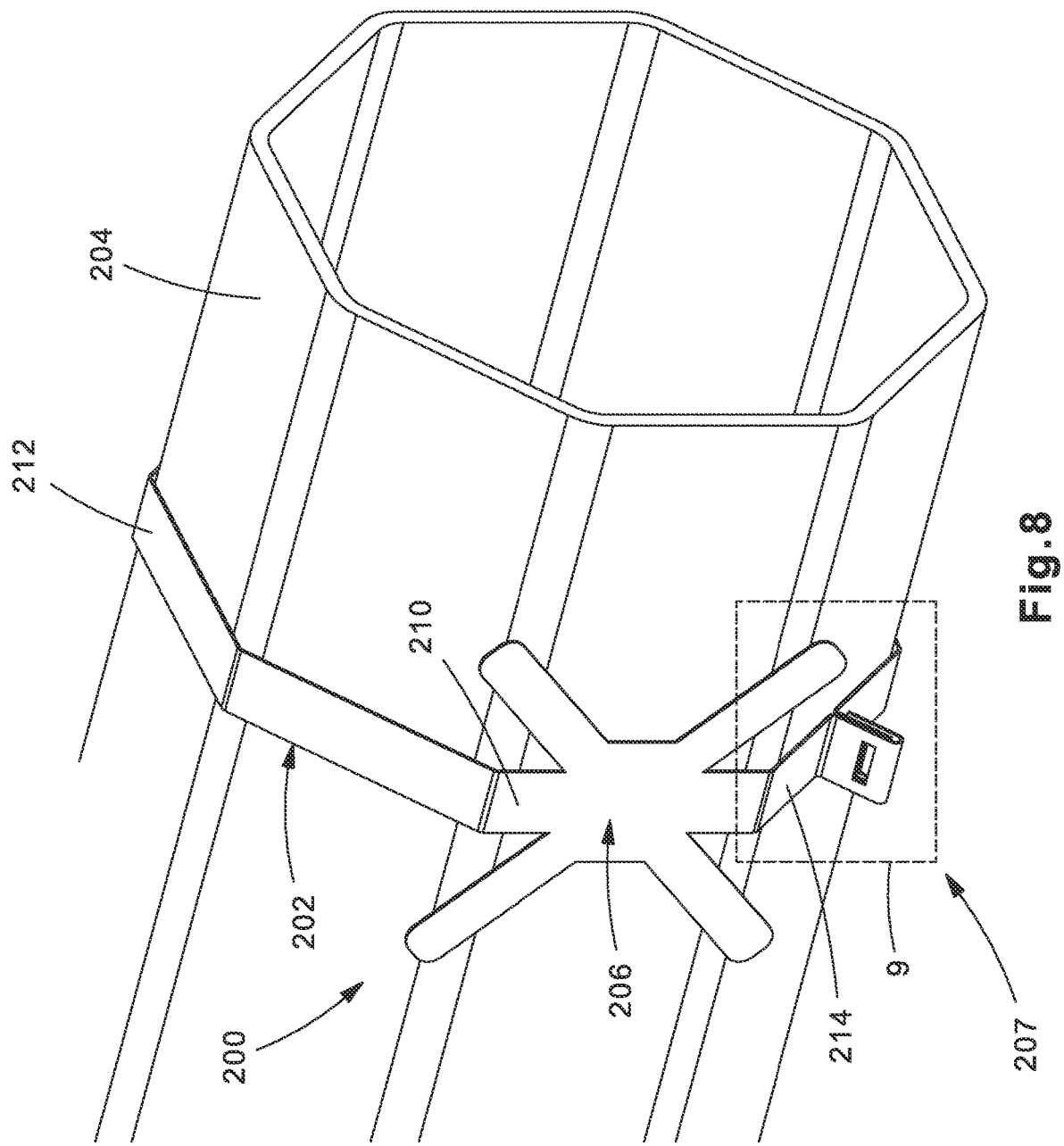

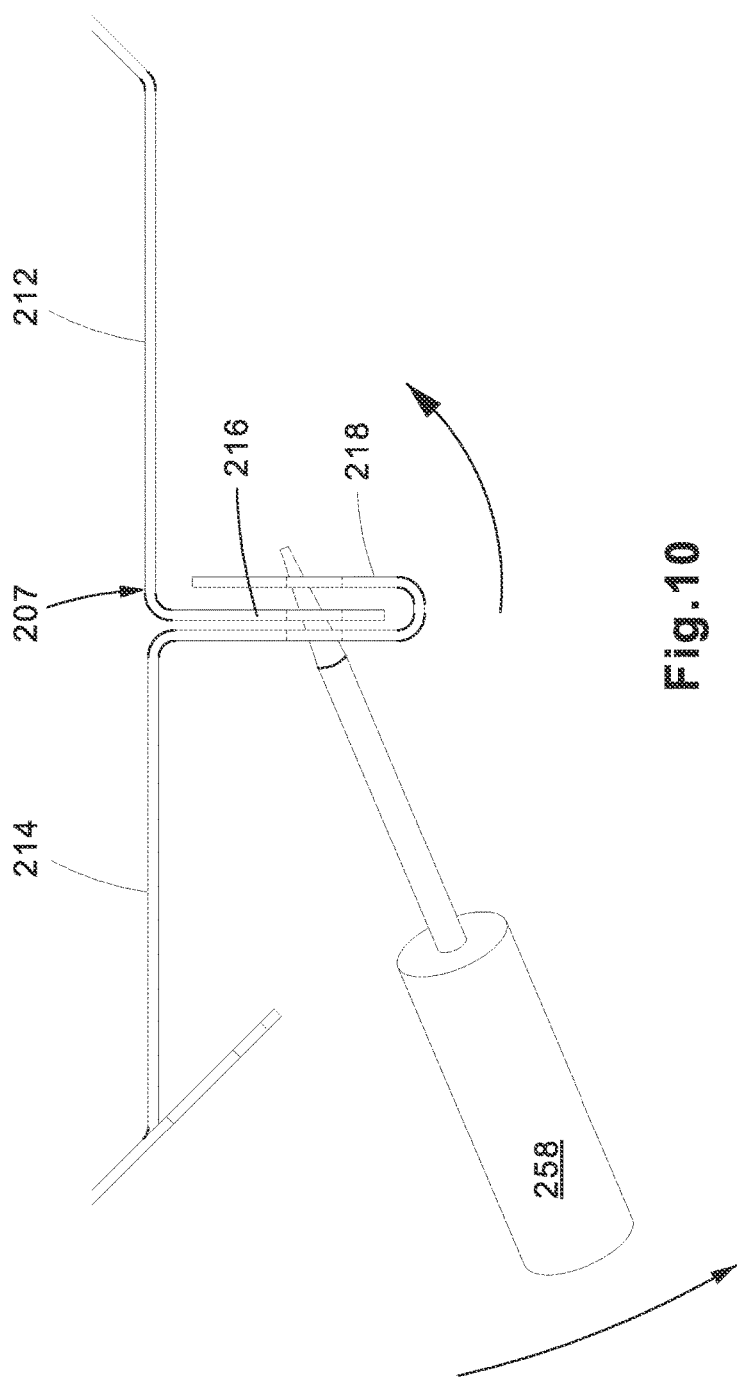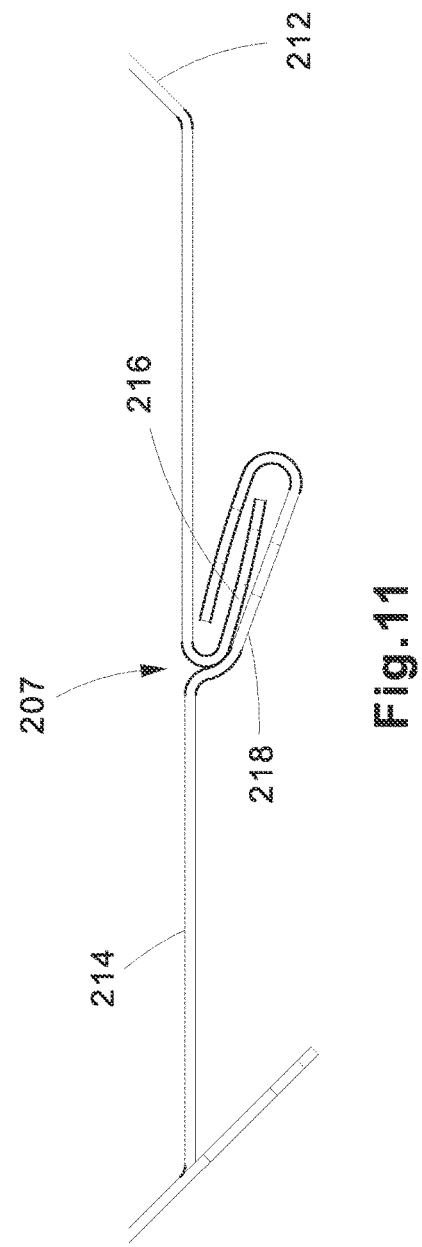

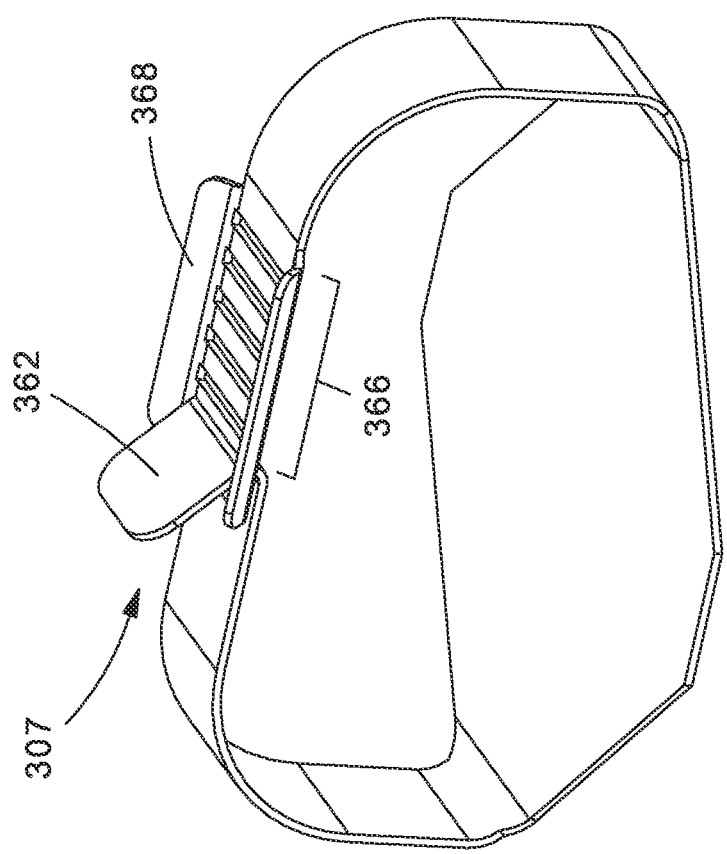

WRAP BRACKET WITH STRAP MOUNT

CROSS REFERENCE TO RELATED APPLICATION

This application claims benefit to U.S. Provisional Patent Application No. 63/094,994, filed on Oct. 22, 2020, the entirety of which is hereby incorporated by reference herein.

TECHNICAL FIELD

One or more embodiments relate to a wrap bracket with a strap mount for securing one or more cables to a support.

BACKGROUND

Machines often includes wires or cables that transmit signals or electrical power between components. Such wires are often bundled together to form a harness that is routed around the machine. The wire harness may be secured to a support structure of the machine by brackets to avoid damage, e.g., by vibration, abrasion, and moisture. Such brackets are often mounted to the support structure using fasteners. These brackets are often time consuming and labor intensive to install.

Cable management using brackets mounted to support structures is also prevalent in various factories, warehouses, data centers, solar farms, and wind farms. Thus, it would be desirable to provide brackets for cable management that are less time consuming and labor intensive to install.

SUMMARY

In one or more embodiments, a wrap bracket is provided with a strap and a clamp. The strap includes: an intermediate portion, a first portion extending away from the intermediate portion in a first direction, and a second portion extending away from the intermediate portion in a second direction that is opposite the first direction. The second portion is adapted to wrap around a support and engage the first portion to mount the strap to the support without a separate fastener. The clamp includes: a base secured to the intermediate portion of the strap, a first tab extending away from the base, and a second tab extending away from the base opposite the first tab. The first tab and the second tab are adapted to collectively wrap around at least one elongated member to secure the elongated member to the base.

BRIEF DESCRIPTION OF THE DRAWINGS

FIG. 5 is a section view of the ratchet mechanism of FIG. 3 taken along section line V-V.

FIG. 6 is another section view of the ratchet mechanism of FIG. 3, illustrating a partially engaged position.

FIG. 7 is a section view of the ratchet mechanism of FIG. 4 taken along section line VII-VII.

FIG. 8 is a front perspective view of a wrap bracket according to another embodiment, illustrated mounted to a support.

FIG. 10 is a side view of the crimp joint of FIG. 8, illustrated with a tool engaging the crimp joint.

FIG. 11 is another side view of the crimp joint of FIG. 8, illustrating a closed position.

FIG. 14 is another side perspective view of the clamp of the wrap bracket of FIG. 12, illustrating a closed position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
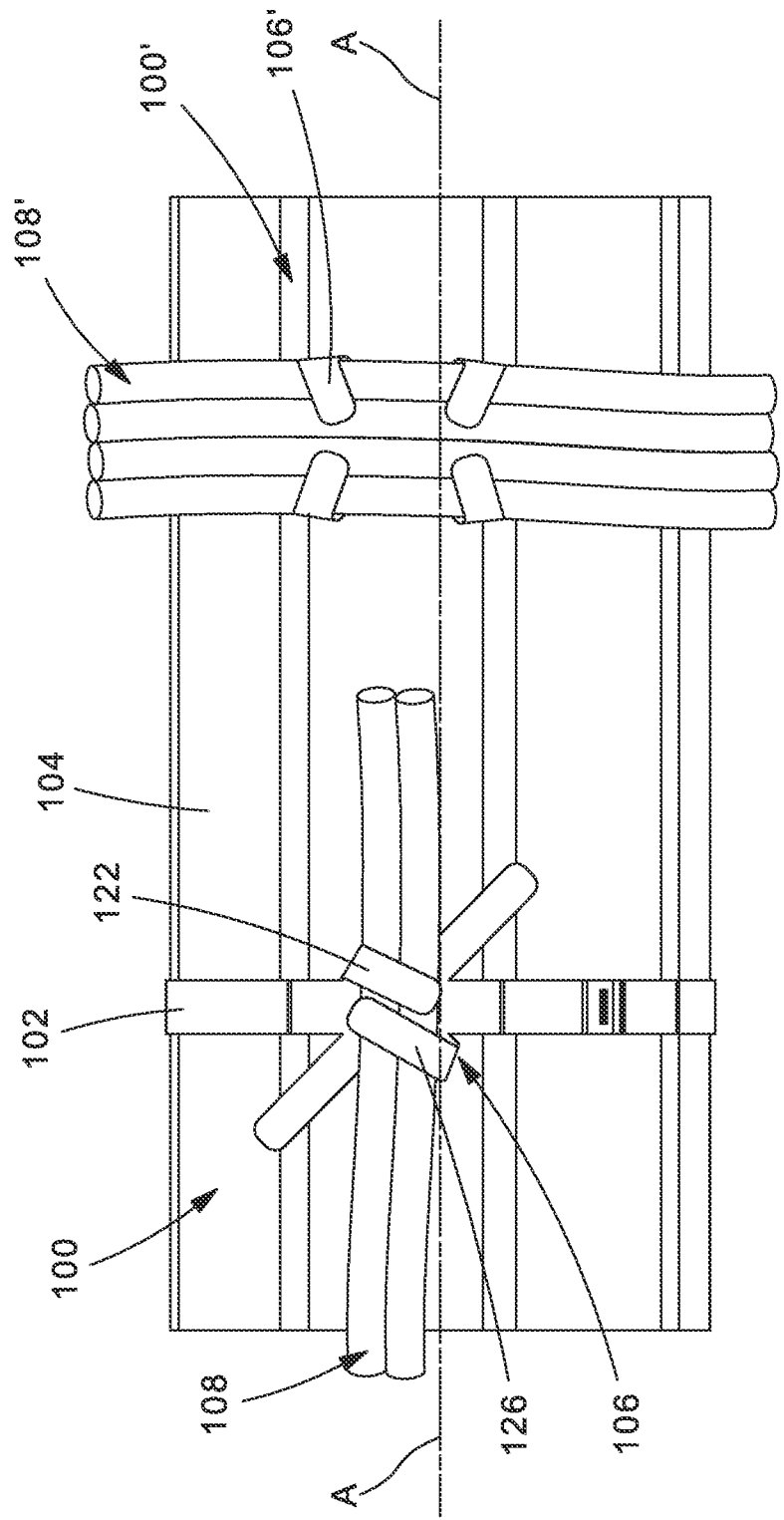
FIG. 1 is a front view of a wrap bracket according to an embodiment, illustrated adjacent to a second wrap bracket and mounted to a support for securing a cable bundle.

With reference to FIG. 1, a wrap bracket is illustrated in accordance with one or more embodiments and generally referenced by numeral 100. The wrap bracket 100 includes a strap 102 that engages a support 104, and a clamp 106 for securing a cable bundle 108 to the support 104. The strap 102 wraps around the support 104 to secure the cable bundle 108 without a separate fastener. The clamp 106 accommodates cable bundles having different quantities of cables, and different routing configurations, according to one or more embodiments. For example, the support 104 is formed in an elongated shape and extends along a longitudinal axis A-A. The clamp 106 may secure a cable bundle 108 that includes two cables and extends longitudinally along the support 104, as shown on the left side of FIG. 1. FIG. 1 also illustrates a second wrap bracket 100' with a second clamp 106' that secures a second cable bundle 108' that includes four cables and extends transversely relative to the support 104. The wrap bracket 100 may be utilized to manage cable routings in various applications, such as solar panel assemblies, wind, oil and gas, etc. For example, in one embodiment, the support 104 represents a panel axis mount of an adjustable solar panel assembly.

Figure 2:
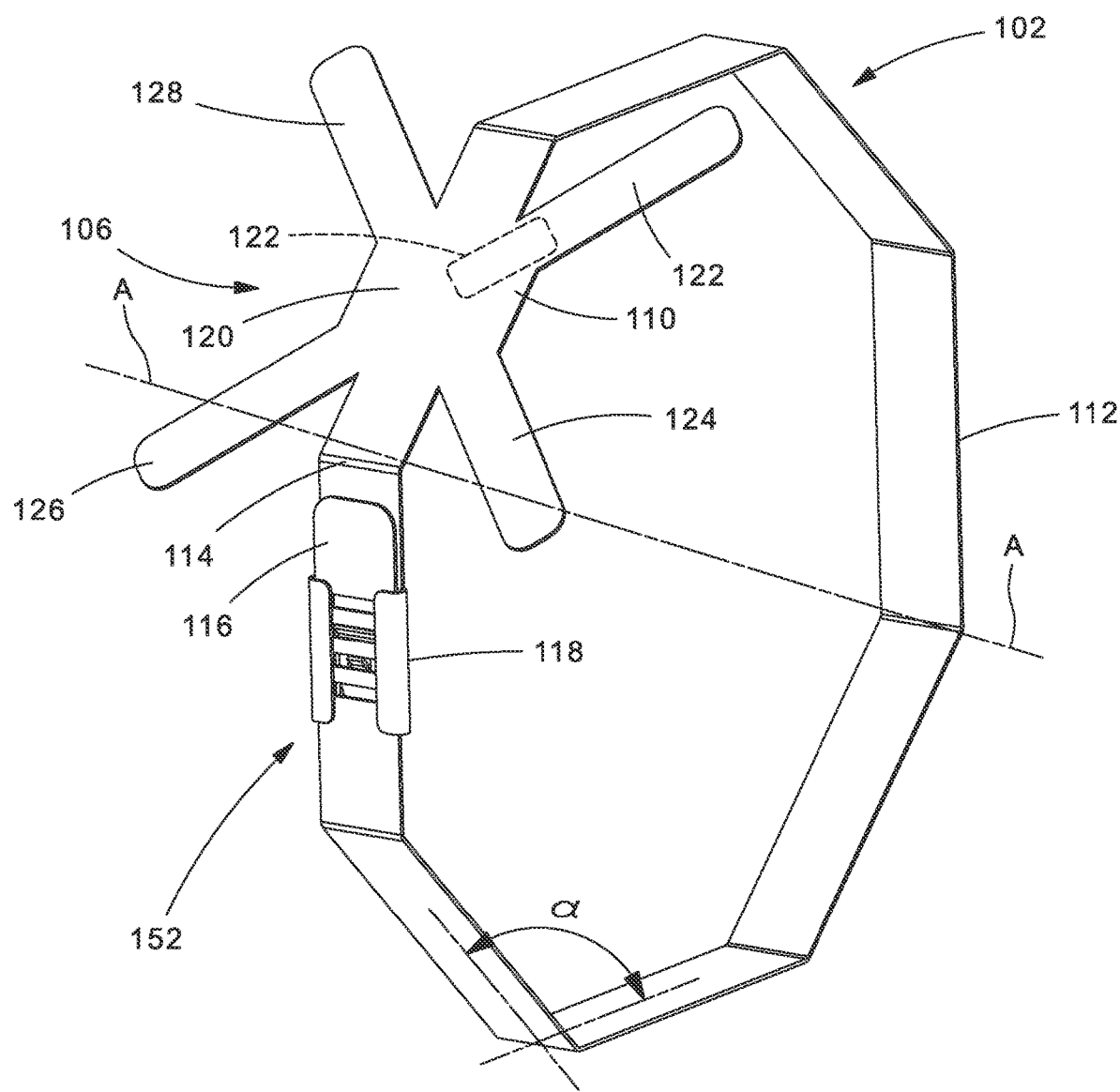
FIG. 2 is a front perspective view of the wrap bracket of FIG. 1.

Referring to FIG. 2, the strap 102 is formed with an elongated length to wrap around the support 104 (shown in FIG. 1). The strap 102 includes an intermediate portion 110 and first and second portions 112, 114 that extend in opposite directions from the intermediate portion 110. The strap 102 may be contoured, e.g., formed into segments that extend at a predetermined angle α from each other corresponding to a shape of the support 104. For example, the support 104 may be formed with an octagonal cross-section, and the strap 102 may be contoured into segments of similar length that extend at an angle of approximately 135 degrees from each other, as illustrated in FIG. 2. The contoured shape of the strap 102 engages the outer surface of the support to limit rotation of the wrap bracket 100 about the longitudinal axis A, which helps maintain the cable routing. The first portion 112 includes a first end segment 116 that engages a second end segment 118 of the second portion 114 to mount the wrap bracket 100 to the support 104.

Although the countered shape of the strap 102 is described with reference to a support 104 having an octagonal cross-section, the strap 102 may mount to any n-sided polygon support. For example, other embodiments of the strap 102 may be contoured to engage the outer surface of a support having different shaped cross-sections, e.g., triangular, square, rectangular, etc. (not shown).

The clamp 106 includes a base 120 that is integrally formed with the intermediate portion 110 of the clamp, according to the illustrated embodiment. In other embodiments, the base 120 may be a separate component that is attached, e.g., welded, to the intermediate portion 110 of the strap 102. The clamp 106 includes multiple tabs that are angularly spaced apart from each other and extend radially outward from the base 120. In the illustrated embodiment, the clamp 106 includes four tabs: a first tab 122, a second tab 124, a third tab 126, and a fourth tab 128 that are equally spaced apart from each other, e.g., at approximately 90 degrees. The tabs 122, 124, 126, and 128 are formed of a bendable material, such as cold rolled steel, galvanized steel, and stainless steel, and are designed to be bent towards each other to collectively wrap around and secure the cable bundle 108. For example, the first tab 122 is shown bent inward in dashed line in FIG. 2, and the first tab 122 and the third tab 126 are illustrated bent towards each other to wrap around the cable bundle 108 in FIG. 1.

Figure 3:
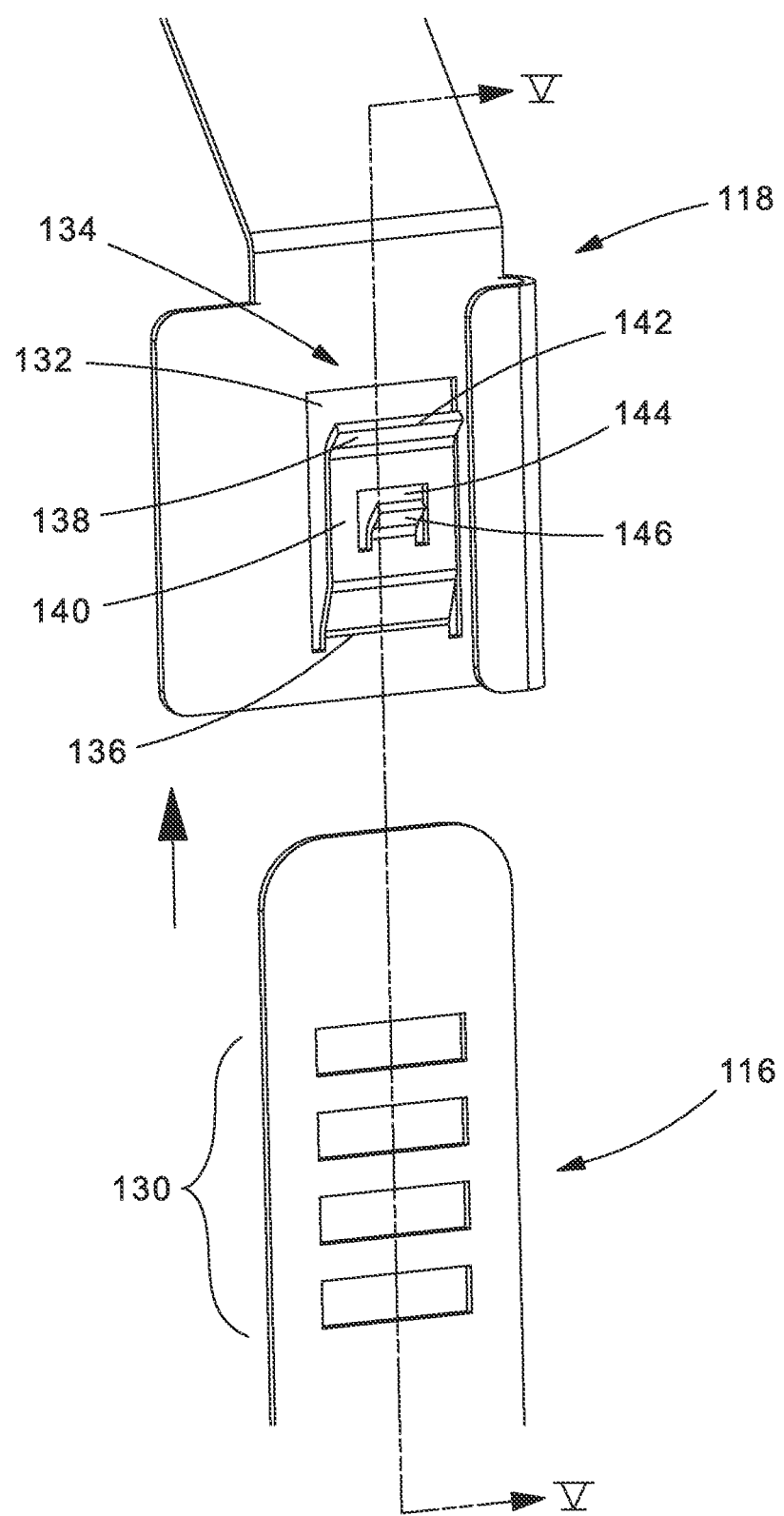
FIG. 3 is an enlarged view of a ratchet mechanism of the wrap bracket of FIG. 1, illustrated in a disengaged position.
Figure 4:
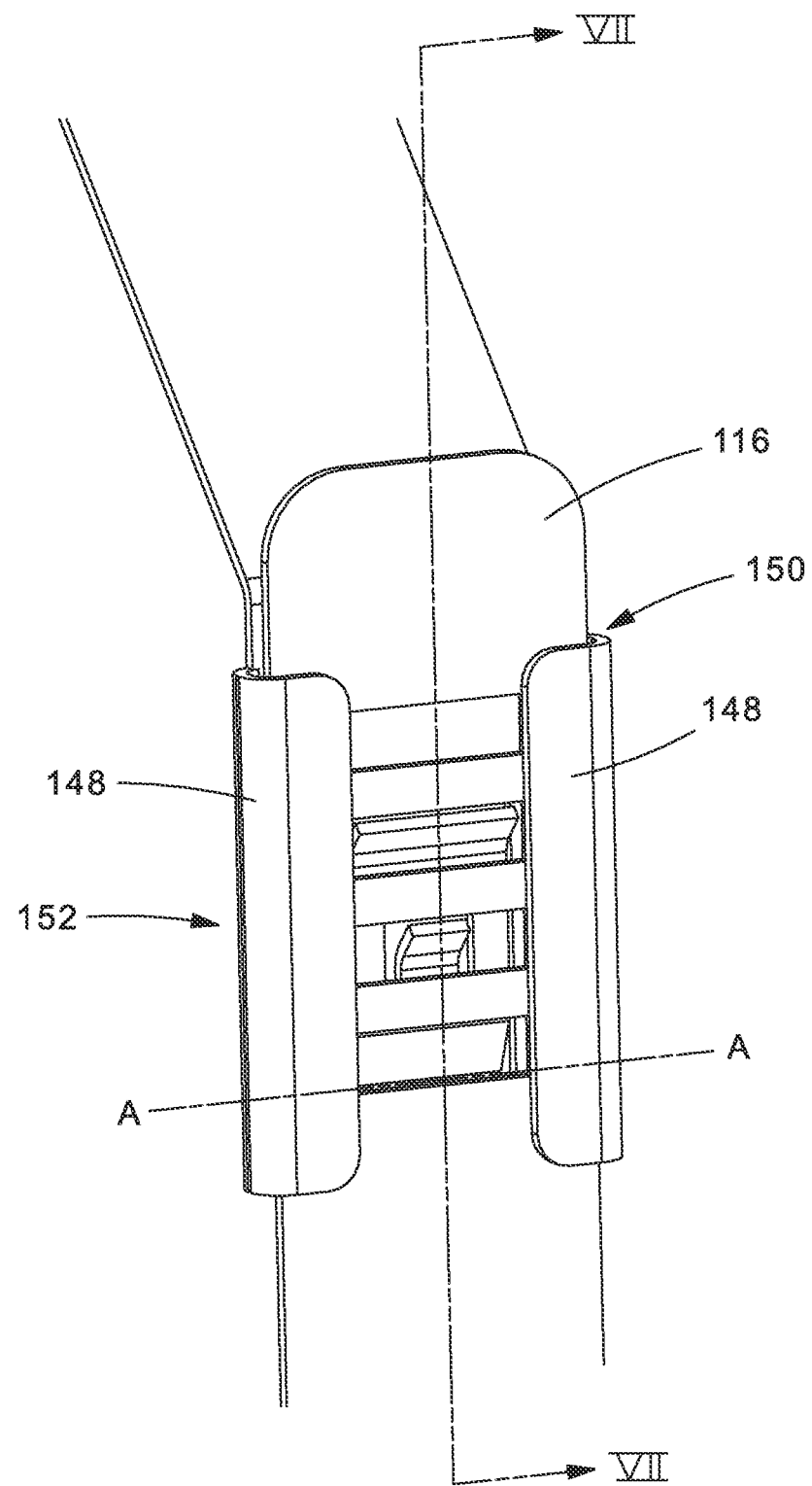
FIG. 4 is an enlarged view of the ratchet mechanism of FIG. 1, illustrated in an engaged position.

With reference to FIGS. 3 and 4, the first end segment 116 of the strap 102 includes a series of slots 130 that are spaced apart from each other along its length. The second end segment 118 includes an aperture 132 and a pawl 134. The pawl 134 includes a proximal end 136, a distal end 138, and a central portion 140. The pawl 134 extends lengthwise into the aperture 132 from the proximal end 136. The distal end 138 extends outward from the central portion 140 to form a first tooth 142. The pawl 134 includes a central aperture 144 and a second tooth 146 that extends into the central aperture 144 and outward from the central portion 140. Referring to FIG. 4, the second end segment 118 includes a pair of flanges 148 that extend transversely from the central portion 140 and then inward toward each other to collectively form a pocket 150 for receiving the first end segment 116. The second end segment 118 is formed with a larger width than the rest of the second portion 114 of the strap 102, as shown on the left side of FIG. 3, and the width is bent inward to form the flanges 148 (FIG. 4).

Referring to FIGS. 5-7, and with reference back to FIG. 1, the first end segment 116 and the second end segment 118 of the strap 102 collectively form a ratchet mechanism 152 for mounting the wrap bracket 100 to the support 104. With reference to FIG. 5, the first tooth 142 and the second tooth 146 extend from the central portion 140 of the pawl 134 at obtuse angles (B) and (C), respectively. In one embodiment angles (B) and (C) are both equal to approximately 135 degrees. The pawl 134 is pivotally connected to the second end segment 118 at the proximal end 136 to form a hinge 154 at point A. The pawl 134 is biased to extend into the slots 130 and engage the first end segment 116 of the strap 102. As illustrated in FIG. 6, the pawl 134 pivots counterclockwise about the hinge 154 to provide clearance as the first end segment 116 is inserted into the pocket 150 of the second end segment 118. As illustrated in FIG. 7, after insertion of the first end segment 116, the pawl 134 pivots clockwise about the hinge 154 such that the teeth 142, 146 engage the first end segment 116 within the slots 130 to prevent movement in the opposite direction to lock the strap 102 in position. The ratchet mechanism 152 of the strap 102 may be released by pushing the pawl 134 downward (not shown), e.g., with a tool such as a screw driver, which pivots the pawl 134 about the hinge 154 to disengage the teeth 142, 146.

With reference to FIG. 8, a wrap bracket is illustrated in accordance with one or more embodiments and generally referenced by numeral 200. The wrap bracket 200 includes a strap 202 that engages a support 204, and a clamp 206 for securing a cable bundle (not shown) to the support 204 without a separate fastener. The strap 202 includes a crimp joint 207 for mounting the wrap bracket 200 to the support, rather than the ratchet mechanism 152 described above for the wrap bracket 100 of FIGS. 1-7. The clamp 206, like the clamp 106 described with reference to FIGS. 1-7, is adjustable to accommodate cable bundles having different quantities of cables, and different cable routing configurations.

The strap 202 is formed with an elongated length to wrap around the support 204. The strap 202 includes an intermediate portion 210 and first and second portions 212, 214 that extend in opposite directions from the intermediate portion 210. The strap 202 may be contoured corresponding to a shape of the support 204 to provide an anti-rotation feature.

Figure 9:
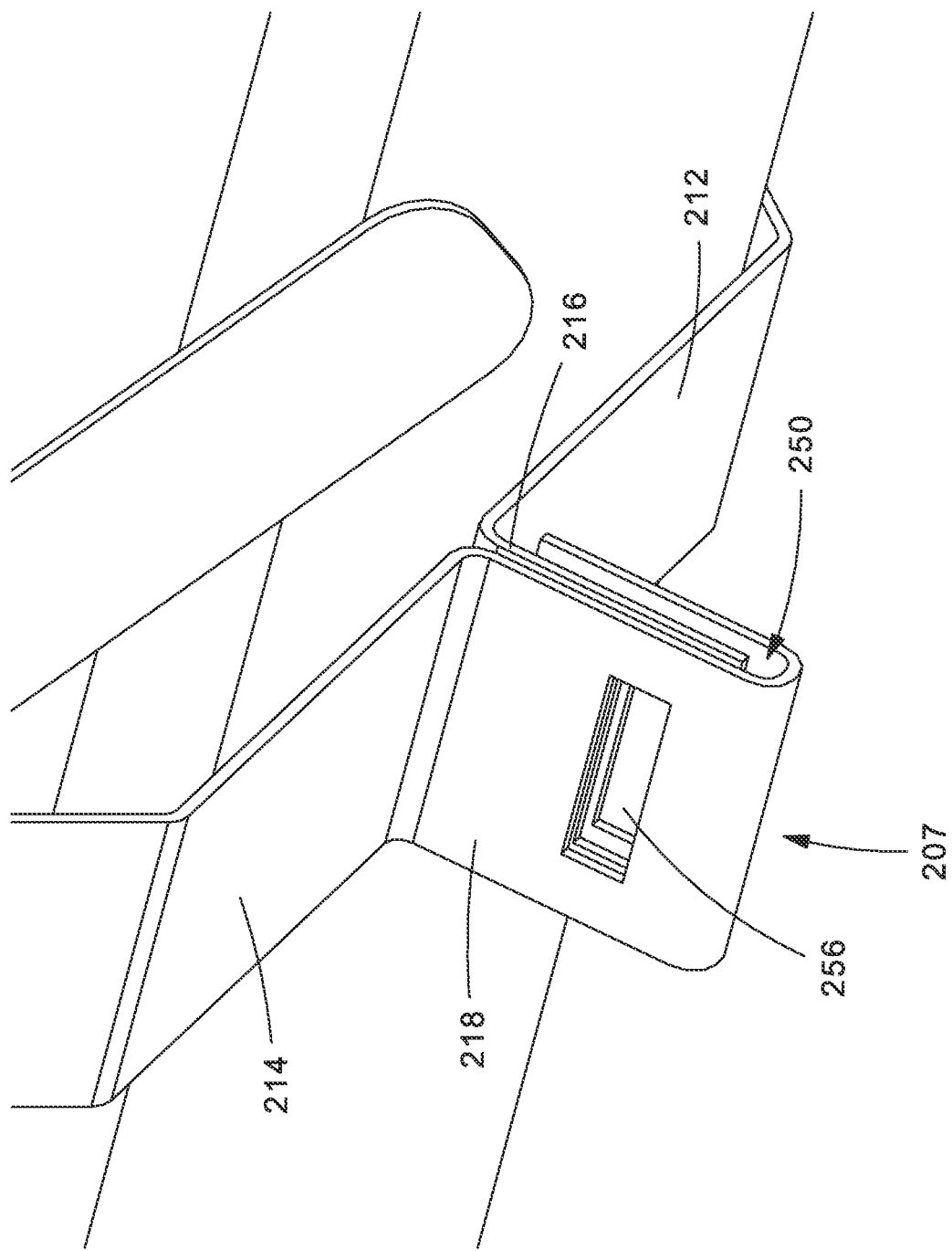
FIG. 9 is an enlarged view of a crimp joint of the wrap bracket of FIG. 8.

Referring to FIG. 9, the first portion 212 of the strap 202 includes a first end segment 216 that engages a second end segment 218 of the second portion 214 to mount the wrap bracket 200 to the support 204. The first end segment 216 extends transversely outward from an adjacent segment of the first portion 212. The second end segment 218 extends transversely outward from an adjacent segment of the second portion 214 and is bent in half to from a pocket 250 for receiving the first end segment 216. The first end segment 216 and the second end segment 218 each include a slot 256 formed through that are aligned with each other when the first end segment 216 is received within the pocket 250.

As illustrated in FIGS. 10 and 11, after the first end segment 216 is received within the pocket 250, both segments 216, 218 may be bent, or plastically deformed, in the same direction to provide the crimp joint 207 for mounting the wrap bracket 200 to the support 204. In one or more embodiments, a user may insert a tool 258, e.g., a flat-blade screwdriver, into the slots 256 to provide leverage for bending the first and second end segments 216, 218.

Figure 12:
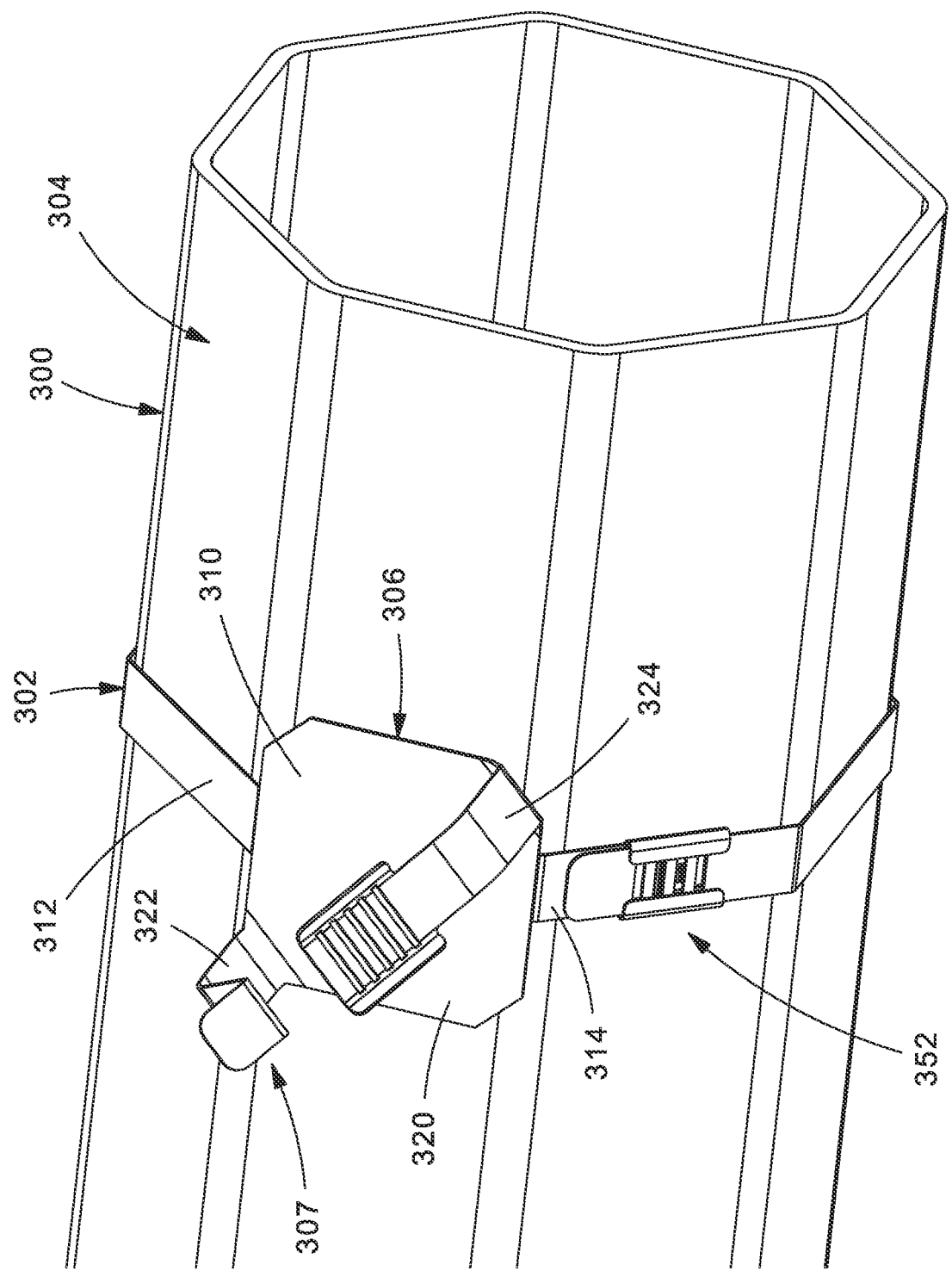
FIG. 12 is a front perspective view of a wrap bracket according to yet another embodiment, illustrated mounted to a support.

With reference to FIG. 12, a wrap bracket is illustrated in accordance with one or more embodiments and generally represented by numeral 300. The wrap bracket 300 includes a strap 302 that engages a support 304, and a clamp 306 for securing a cable bundle (not shown) to the support 304. The strap 302 wraps around the support 304 to secure the cable bundle using a ratchet mechanism 352, and without a separate fastener, like the wrap bracket 100 described with reference to FIGS. 1-7. The clamp 306 includes a latch mechanism 307 to accommodate cable bundles having different quantities of cables, according to one or more embodiments.

The strap 302 is formed with an elongated length to wrap around the support 304. The strap 302 includes an intermediate portion 310 and first and second portions 312, 314 that extend in opposite directions from the intermediate portion 310. The clamp 306 may be a separate component that is attached, e.g., welded, to the intermediate portion 310 of the strap 302. In other embodiments, the clamp 306 is integrally formed with the intermediate portion 310 of the clamp. The clamp 306 includes a first tab 322, and a second tab 324 that are angularly spaced apart from each other and extend radially outward from a base 320. The tabs 322, 324 are formed of an elastic material, such as spring steel.

Figure 13:
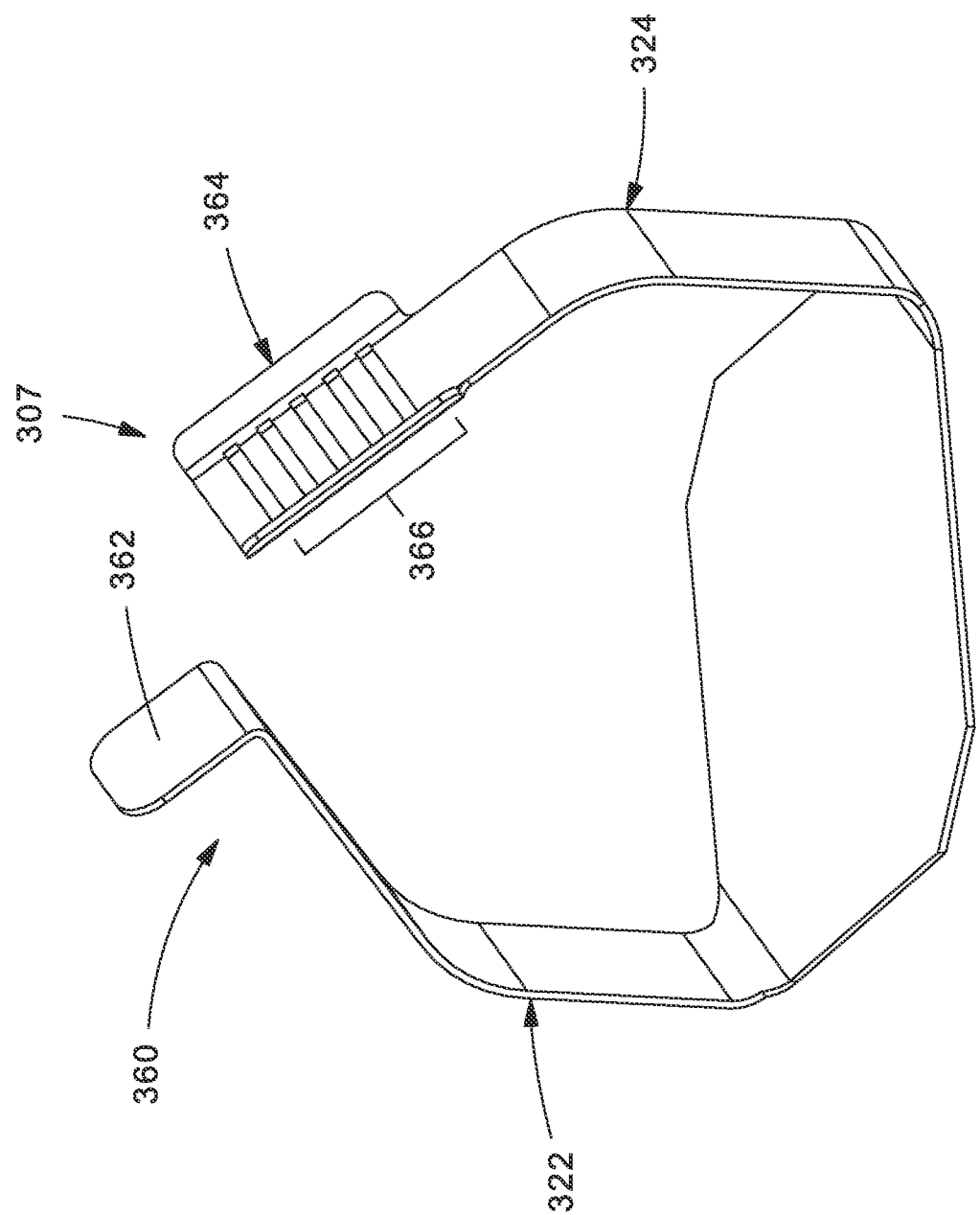
FIG. 13 is a side perspective view of a clamp of the wrap bracket of FIG. 12, illustrating an open position.

Referring to FIGS. 13 and 14, the first tab 322 and the second tab 324 are designed to engage each other to provide the latch mechanism 307 to secure the cable bundle. The first tab 322 includes a first end 360 that is bent back lengthwise to form a hook 362. The second tab 324 includes a second end 364 with a series of slots 366 formed through. As shown in FIG. 14, the hook 362 is inserted through one of the slots 366 to lock the first and second tabs 322, 324 together to secure a cable bundle. The second end 364 may be formed with a larger width than the rest of the second tab 324 to form a pair of ribs 368 that extend outward and upward to provide strength.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wrap bracket comprising:
 a strap comprising:
  an intermediate portion,
  a first portion extending away from the intermediate portion in a first direction, and
  a second portion extending away from the intermediate portion in a second direction that is opposite the first direction, wherein the second portion is adapted to wrap around a support and engage the first portion to mount the strap to the support without a separate fastener; and
 a clamp comprising:
  a base secured to the intermediate portion of the strap,
  a first tab extending radially outward in an initial position away from the base, and
  a second tab extending radially outward in an initial position away from the base opposite the first tab, wherein the first tab and the second tab are adapted to collectively wrap around at least one elongated member to secure the elongated member to the base;
  wherein the strap is formed into planar segments that are angularly spaced apart from adjacent segments to correspond with an outer surface of the support to limit rotation of the wrap bracket relative to the support.

2. The wrap bracket of claim 1 wherein the first tab and the second tab of the clamp are formed of a bendable material and are adapted to bend towards each other to collectively wrap around and secure the elongated member.

3. The wrap bracket of claim 1 wherein the clamp further comprises a third tab and a fourth tab both extending radially outward in an initial position from the base, wherein the first tab, the second tab, the third tab, and the fourth tab are equally spaced apart 90 degrees from each other.

4. The wrap bracket of claim 1 wherein the base of the clamp is integrally formed with the intermediate portion of the strap to provide a one-piece wrap bracket.

5. The wrap bracket of claim 1 wherein the base of the clamp is attached to the intermediate portion of the strap.

6. The wrap bracket of claim 1 wherein the first portion of the strap comprises a first end segment that extends transversely from an adjacent segment of the first portion, and wherein the second portion comprises a second end segment that extends transversely outward from an adjacent segment of the second portion and is bent in half to form a pocket for receiving the first end segment.

7. The wrap bracket of claim 6 wherein the first end segment and the second end segment are adapted to be plastically deformed together to provide a crimp joint to lock the first portion and the second portion together.

8. The wrap bracket of claim 1 wherein at least one of the first portion and the second portion of the clamp includes a slot formed through and the other of the first portion and the second portion forms a hook to extend through the slot to lock the first portion and the second portion together.

9. A wrap bracket comprising:
 a strap comprising:
  an intermediate portion,
  a first portion extending away from the intermediate portion in a first direction, and
  a second portion extending away from the intermediate portion in a second direction that is opposite the first direction, wherein the second portion is adapted to wrap around a support and engage the first portion to mount the strap to the support without a separate fastener; and
 a clamp comprising:
  a base secured to the intermediate portion of the strap,
  a first tab extending radially outward in an initial position away from the base, and
  a second tab extending radially outward in an initial position away from the base opposite the first tab, wherein the first tab and the second tab are adapted to collectively wrap around at least one elongated member to secure the elongated member to the base;
 wherein at least one of the first portion and the second portion of the strap includes a slot formed through and the other of the first portion and the second portion includes a pawl biased to extend through the slot to lock the first portion and the second portion together.

10. A wrap bracket comprising:
 a strap comprising:
  an intermediate portion,
  a first portion extending away from the intermediate portion in a first direction, and
  a second portion extending away from the intermediate portion in a second direction that is opposite the first direction, wherein the second portion is adapted to wrap around a support and engage the first portion to mount the strap to the support without a separate fastener; and
 a clamp comprising:
  a base secured to the intermediate portion of the strap,
  a first tab extending radially outward in an initial position away from the base, and
  a second tab extending radially outward in an initial position away from the base opposite the first tab, wherein the first tab and the second tab are adapted to collectively wrap around at least one elongated member to secure the elongated member to the base;
 wherein the first portion comprises a first end segment with at least one slot formed through, and wherein the second portion comprises:
  a second end segment with an aperture formed through; and
 a pawl pivotally connected to the second end segment and biased to extend through the at least one slot of the first end segment to provide a ratchet mechanism to lock the first portion and the second portion together.

11. The wrap bracket of claim 10 wherein the at least one slot of the first end segment comprises a first slot and a second slot, and wherein the pawl comprises:
- a first tooth adapted to engage the first end segment within the first slot; and
- a second tooth spaced apart from the first tooth and adapted to engage the first end segment within the second slot.

* * * * *